(12) United States Patent
Engelhardt

(10) Patent No.: US 6,686,583 B2
(45) Date of Patent: Feb. 3, 2004

(54) APPARATUS FOR COUPLING LIGHT INTO AN OPTICAL ASSEMBLAGE AND CONFOCAL SCANNING MICROSCOPE

(75) Inventor: Johann Engelhardt, Bad Schoenborn (DE)

(73) Assignee: Leica Mircrosystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/901,900

(22) Filed: Jul. 11, 2001

(65) Prior Publication Data

US 2002/0003204 A1 Jan. 10, 2002

(30) Foreign Application Priority Data

Jul. 10, 2000 (DE) .......................................... 100 33 269

(51) Int. Cl.[7] .................................................. H01J 3/14
(52) U.S. Cl. .................................. 250/216; 250/227.18
(58) Field of Search ........................... 250/216, 227.18, 250/227.23, 227.24; 362/259, 276; 385/4, 7, 25

(56) References Cited

U.S. PATENT DOCUMENTS

| | | | | |
|---|---|---|---|---|
| 5,323,009 A | * | 6/1994 | Harris | 250/458.1 |
| 5,444,528 A | * | 8/1995 | Puschell | 356/73 |
| 5,841,577 A | * | 11/1998 | Wachman et al. | 359/386 |
| 6,167,173 A | * | 12/2000 | Schoeppe et al. | 385/33 |
| 2002/0006264 A1 | * | 1/2002 | Birk et al. | 385/147 |

* cited by examiner

Primary Examiner—Kevin Pyo
Assistant Examiner—Seung C. Sohn
(74) Attorney, Agent, or Firm—Crowell & Moring LLP

(57) ABSTRACT

The present invention concerns an apparatus for coupling light (1) of at least one wavelength of a laser light source (2) into an optical assemblage (3), preferably into a confocal scanning microscope, having an optically active component (4) that serves in particular to select the wavelength and to set the power of the coupled-in light (5). To ensure that changes in the power and/or wavelength of the laser light source do not affect the power of the light (5) coupled into the optical assemblage, the apparatus according to the present invention is characterized in that in order to influence the coupled-in light (5), the component (4) serves as the adjusting element of a control system (11).

15 Claims, 4 Drawing Sheets

APPARATUS FOR COUPLING LIGHT INTO AN OPTICAL ASSEMBLAGE AND CONFOCAL SCANNING MICROSCOPE

CROSS REFERENCE TO RELATED APPLICATIONS

This invention claims priority of a German patent application DE 100 33 269.2 which is incorporated by reference herein.

FIELD OF THE INVENTION

The present invention concerns an apparatus for coupling light of a laser light source into an optical assemblage

BACKGROUND OF THE INVENTION

Apparatuses of the generic type are used in practice to couple light into a wide variety of optical assemblages. In particular when laser light of several wavelengths is to be coupled into an optical assemblage, an optically active component is used to couple it in, since with the optically active component light of one wavelength can in each case be selected and coupled into the optical assemblage. In particularly advantageous fashion in this context, the power of the coupled-in light of a specific wavelength can also be adjusted and modified by means of the optically active component. An optical assemblage could be, for example, a confocal scanning microscope or an apparatus for projecting laser light onto a screen. In the case of the latter assemblage it is possible by means of a suitable scanning apparatus to project a color image or a color image sequence, with the possibility of a different color value being present at each projected image point. An optically active component makes possible a rapid modification of the power of the light of the different wavelengths, so that by using an optically active component to couple laser light into a projection apparatus it is possible to display images at video speed. In the case of confocal fluorescent scanning microscopy as well, excitation of several fluorescent dyes with laser light of different wavelengths, in a manner modified line by line and/or pixel by pixel, is useful for many applications and is utilized in practice.

Many laser light sources in some cases exhibit, however, large fluctuations in light output and in the wavelength of the emitted light. The emission wavelength of diode lasers, for example, depends on the operating temperature of the laser diode: the emitted wavelength of the diode laser changes by approx. 2 to 3 nm per degree K. This is moreover associated with a change in the emitted power of the diode laser, which in itself is not tolerable for many applications. When the wavelength of the emitted light changes, however, there is usually also a change in the power of the light coupled into the optical assemblage, since generally the optically active component acts only on light of a specific wavelength or within a sharply delimited wavelength region. But if the wavelength or wavelength region of the laser light source changes, the power of the light coupled in by the optically active component also, disadvantageously, changes.

SUMMARY OF THE INVENTION

It is therefore the object of the present invention to describe an apparatus for coupling light of at least one wavelength of a laser light source into an optical assemblage, in which changes in the power and/or wavelength of the laser light source have no effect on the power of the light coupled into the optical assemblage.

The apparatus of the generic type according to the present invention achieves the aforesaid object, wherein the apparatus comprising: a laser light source generating at least one wavelength, an optically active component for selecting the wavelength and for setting the power of the coupled-in light, and a control system for influencing the coupled-in light with regard to minimize fluctuations in the light output of the coupled-in light.

It is an other object of the present invention to provide a confocal scanning microscope, in which changes in the power and/or wavelength of the laser light source have no effect on the power of the light coupled into the microscope.

The above object is accomplished by a confocal scanning microscope comprising: a laser light source defining at least one wavelength, an apparatus for coupling light of the laser light source into the confocal scanning microscope, an optically active component being arranged in the apparatus for coupling light of the laser light source into the confocal scanning microscope, wherein the optically active component serves to select the wavelength and to set the power of the light to be coupled-in, and a control system for influencing the component in order to minimize fluctuations in the light output of the light to be coupled-in.

What has been recognized according to the present invention is firstly that the optically active component can be used not only to couple the laser light into the optical assemblage, but moreover also as the adjusting element of a control system. It is thereby advantageously possible—assuming a suitable control loop—for the coupled-in light to be influenced in such a way that fluctuations of the laser light source affect the power of the coupled-in light only within an acceptable range, or not at all.

In particularly advantageous fashion, only the optically active component is used as an adjusting element by the control system. No attempt is therefore being made to regulate the laser light source itself; rather the control system makes use of an adjusting element that often is provided in any case for coupling light into an optical assemblage. Accordingly, and advantageously, it is not necessary to provide additional, expensive optical elements (in some cases also affected by aberrations) which are capable of achieving the object mentioned initially.

Several control strategies that can meet the differing requirements of an optical assemblage will be described below.

The control system could be designed in such a way that it serves to minimize fluctuations in the light output of the coupled-in light. In this context, particular consideration can be given to short-term fluctuations of the laser light source, which are correspondingly minimized by the control system. If the fluctuations of the laser light source are the result of thermal changes, they are generally fluctuations on a scale of seconds, which must also be minimized by the control system.

It would also be possible to define a time-related power profile of the light that is to be coupled in, said profile to be achieved by the control system. Here again, provision is made for minimizing fluctuations in the power of the light being coupled in. The time-related power profile could be, for example, a periodic amplitude modulation or a continuously rising and/or falling change in the power of the light being coupled in. Examples of an amplitude modulation of this kind are square-wave, sawtooth, or sinusoidal power profiles.

The control system could also be designed in such a way that it serves to maximize the light output of the coupled-in light. This is necessary in particular when the available power of the laser light source differs only slightly from the light output needed in the optical assemblage.

For many applications, the control system will attempt to couple a substantially constant light output into the optical assemblage. The coupling in of light of any fraction of the maximum light output is also conceivable.

In a concrete embodiment, the control system is configured in such a way that a modification and/or setting made by a user is taken into account, i.e. the control system is aware of the modified setting. If the control system is not aware of the modifications and/or settings made by a user, then for example after an increase in the output power of the laser directly at the laser controller, the control system would, however, annul that change so as to continue maintaining a constant light output for the coupled-in light, by the fact that the control system couples into the optical assemblage the originally defined constant light output. It is therefore important to ensure that the modifications and/or settings made by a user are taken into account by the control system as new setpoints, and are controlled accordingly. In addition to modifications and/or settings of the emission power of the laser light source, the ratio between coupled-in and non-coupled-in light could also be modified, and/or a periodic amplitude modulation of the light being coupled in could be effected by a user.

Advantageously, the control system can be synchronized with an illumination operation and/or detection operation of the optical assemblage. In the case of confocal scanning microscopy in particular, provision is made for synchronization of the control system with the detection operation. The purpose of this action is to ensure that optimum operating conditions are present in particular during an illumination operation and/or detection operation.

The optically active component is an acoustooptical or electrooptical component. In a concrete embodiment, the optically active component is an acoustooptical tunable filter (AOTF) or an acoustooptical beam splitter (AOBS). The AOTF or AOBS can be controlled by a control unit.

In very general terms, in an AOBS or AOTF, light of a specific wavelength is refracted at a mechanical acoustic wave running through the crystal of the AOBS or AOTF, or as a result of the mechanical acoustic wave of a specific frequency extending through the crystal, the Bragg condition is created for light of a wavelength corresponding to the frequency of the mechanical acoustic wave. The component can thus be impinged upon by an acoustic wave of a specific frequency, so that light of a wavelength region corresponding to the frequency of the acoustic waves can be coupled into the optical assemblage or into the confocal scanning microscope. The wavelength region is generally a spectrally sharply delimited region of a few nanometers.

The power of the coupled-in light can be influenced by the amplitude of the frequency present in the AOTF or AOBS. If the optical component is actively coupling light into the optical assemblage, an increase in the amplitude of the mechanical acoustic wave would increase the power of the light being coupled in. In the context of active coupling, only the light refracted at an acoustic wave of a specific frequency is coupled into the optical assemblage.

To determine the presently existing actual value that is relevant for the control system, provision is made for the light output to be detected by a corresponding detector. All common detectors, for example a photodiode or a laser power meter, are suitable in this context for determining the light output.

In similar fashion, provision is made for detecting the change in the wavelength of the light. The measurement could be made, in this context, with a spectrometer, a multiband detector, or a semiconductor wavemeter. A semiconductor wavemeter is a detector that comprises two different photodiodes, arranged one above another, which have different spectral detection properties. If there is a change in the wavelength of the light that is to be detected, the intensities detected by the two different photodiodes of the semiconductor wavemeter also change, allowing a determination of the modified wavelength of the measured light.

The detector used for measurement can be arranged before and/or after the optically active component. Concretely, provision is made for the detector to be arranged behind a semitransparent mirror, a dichroic beam splitter, an uncoated glass plate, and/or a coated glass plate. For example, the measurement before the optically active component could be accomplished by means of a corresponding arrangement of an uncoated glass plate in the optical beam path between the laser light source and the optically active component. The glass plate couples out of the illuminating beam path a small portion of the illuminating light, which is conveyed to a detector arranged after the glass plate. The measurement after the optically active component could advantageously be performed after a dichroic beam splitter or a semitransparent mirror which is in any case arranged in the beam path of the optical assemblage. The corresponding detector would accordingly need to be positioned behind the semitransparent mirror or dichroic beam splitter; advantageously, with this procedure there is no need for alignment of individual components of the optical assemblage.

The measurement could also be accomplished in the portion of the beam path that is not coupled in. Usually the portion of the laser light that is not coupled in is absorbed by a beam trap. A corresponding detector that detects a wavelength change or the light output could, however, be located in its place. Ideally, in order to measure the actual value a measurement is made of the light before the optically active component and in the portion of the beam path that is not coupled in; or the measurement is performed after the optical component (i.e. in the optical assemblage) and in the portion of the beam path that is not coupled in. Detection of the actual value before and after the component is also conceivable.

The detected readings are conveyed to a controlling element. Those detected readings are thus the actual value or values that is or are relevant for the controlling element.

In a concrete embodiment, the readings of a detector arranged before the component and the readings of a detector arranged after the component are detected simultaneously. The quotient of those readings is conveyed to the controlling element. This procedure is advantageous in particular if the control system must take into account a time-related power profile of the light being coupled in. A time-related power profile of the light being coupled in could be represented, for example, by a sinusoidal amplitude modulation of the light of the laser light source, the actual value of which is detected by the detector arranged before the optical component. Simultaneous detection of the light output after the optically active component by a correspondingly arranged detector supplies an actual value for the coupled-in light. The quotient of those two detected actual values is then conveyed to the controlling element, and the control system could aim to keep that quotient substantially constant.

The controlling element, by way of the control unit, adjusts the optically active component as defined by the control system. The control unit controls or adjusts the optically active component by application of a mechanical acoustic wave. Ultimately the control unit delivers an alternating voltage that causes mechanical deflection or oscillation of the piezoelement present on the AOTF or AOBS, thus generating the mechanical acoustic wave in the AOTF or AOBS. The essential parameters that the control unit modifies upon adjustment are on the one hand the frequency of the alternating voltage and on the other hand the amplitude of the alternating voltage. In the event of a change in the wavelength of the light, the frequency of the alternating voltage output by the control unit is modified in such a way that one of the control strategies described above can be achieved. If the power of the light changes, then in addition the amplitude of the alternating voltage output by the control unit can be modified or set so that one of the control strategies described above can be achieved. A combined change in the frequency of the alternating voltage and the amplitude of the alternating voltage is also provided for, since, for example, a change in the wavelength of the light is generally also associated with a change in power. In this case first a change in the frequency of the alternating voltage output by the control unit, and then a change in the amplitude of the alternating voltage output by the control unit, would need to be performed.

The control loop is configured in the form of an electrical circuit. The control loop could be a phase-locked loop (PLL) circuit; the control loop could comprise a proportional controller, a proportional-integral controller, or a proportional-integral-differential controller.

In a concrete embodiment, provision is made for a calibration. The calibration could be accomplished during, before, and/or after an illumination and/or detection operation of the optical assemblage. If the optical assemblage is a confocal scanning microscope, a calibration is provided for before and after a detection operation or image acquisition. If a longer-duration specimen detection is performed, provision is also made for a calibration during the imaging operation with the confocal scanning microscope.

The calibration could be capable of being synchronized with an illumination and/or detection operation of the optical assemblage, in particular of the confocal scanning microscope.

For calibration, at least two different readings are detected. Preferably three different readings are recorded. With regard to calibration of the laser power, for example the laser light source could be set to an initially low power level, for example 20 mW, and the light output could be determined with a correspondingly arranged detector. The power of the laser light source could then be set to a higher value, for example 80 mW, and a second measurement of the laser light output now present could be performed with the detector. Lastly, a third calibration could be performed in which the laser is set to a high output power, for example 150 mW. If the calibration comprises enough readings, the control system value to be set could in fact be ascertained on the basis of a calibration measurement.

The control system takes the calibration values into account by the fact that, for example, the measured calibration values are transmitted to the controlling element and stored there. If provision is made for several calibrations, the new calibration values could replace the old ones, or could be additionally stored in the controlling element.

The association between measured values (actual values) and control values (setpoints) could be made by means of a look-up table (LUT). This contains the values that are output by the controlling element or control unit of the component when correspondingly measured actual values are present. An association between measured values and control values could be made with the assistance of a control computer.

Provision is made in general for the use of light of different wavelengths. In this case the control system refers in each case to the light of one wavelength. Thus if light of two different wavelengths is to be coupled simultaneously into an optical assemblage, the control system could be designed, for example, in such a way that a maximization of the light output of the light of the first wavelength, and a substantially constant light output of the light of the second wavelength, can be achieved by the control system.

BRIEF DESCRIPTION OF THE DRAWINGS

There are various ways of advantageously embodying and developing the teaching of the present invention. In conjunction with the explanation of the preferred exemplary embodiments of the invention with reference to the drawings, an explanation is also given of generally preferred embodiments and developments of the teaching. In the drawings.

DETAILED DESCRIPTION OF THE INVENTION

Figure 1:
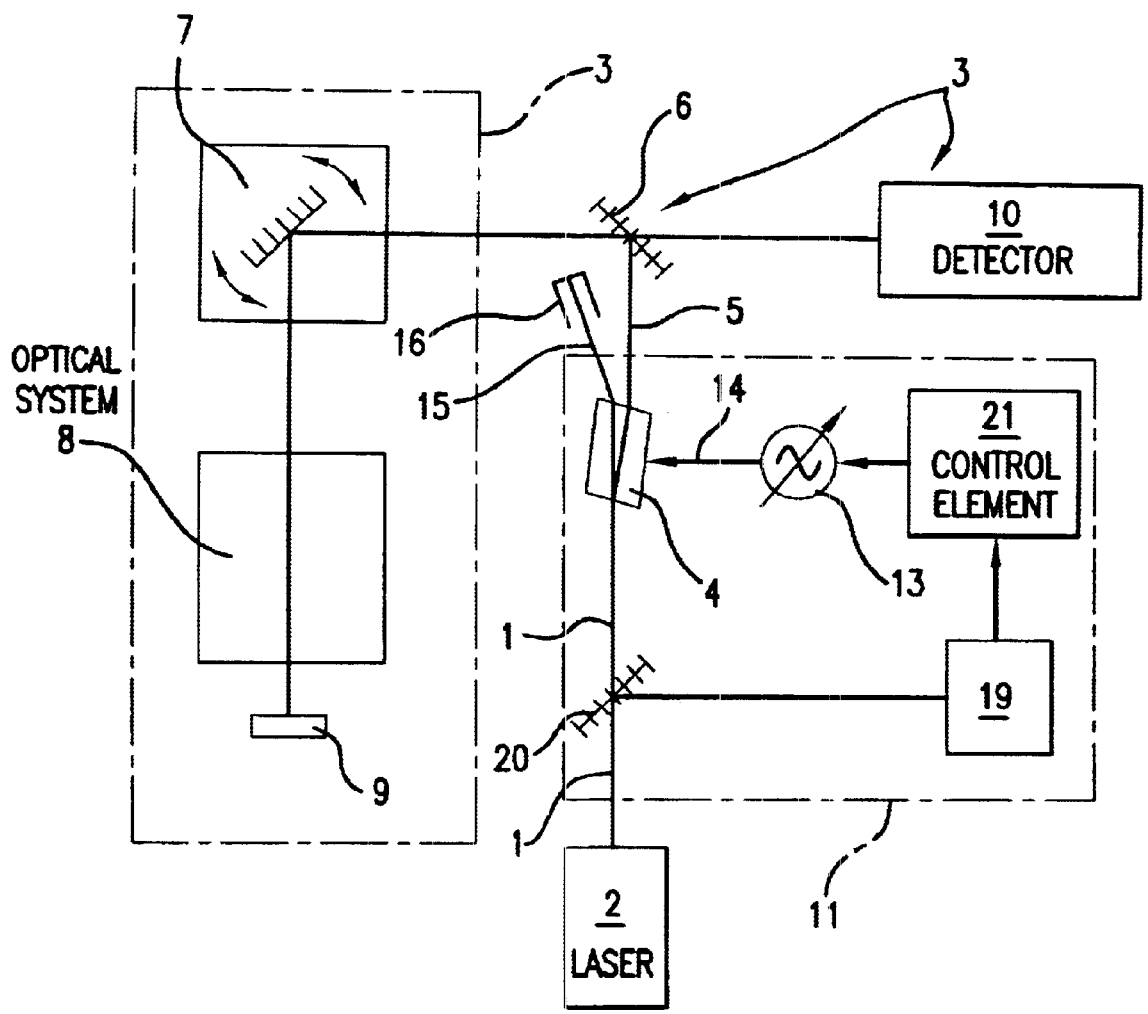
FIG. 1 is a schematic depiction of an exemplary embodiment of an apparatus for coupling light of at least one wavelength into an optical assemblage.

FIGS. 1 through 4 each show an apparatus for coupling light 1 of at least one wavelength of a laser light source 2 into an optical assemblage 3. In the interest of a clear depiction, the subassemblies of optical assemblage 3 are shown with the reference character 3 only in FIG. 1. Optical assemblage 3 is a confocal scanning microscope. The apparatus for coupling in light 1 has an optically active component 4 that serves to select the wavelength and to set the power of light 5 coupled into optical assemblage 3. Light 5 that is coupled into the confocal scanning microscope strikes a dichroic beam splitter 6 and is reflected to scanning device 7, where the light is deflected, by means of a movably arranged mirror, in two directions perpendicular to one another. The light thus deflected is directed through microscope optical system 8 to specimen 9. The light returning from specimen 9 passes in the opposite direction through microscope optical system 8 and scanning device 7, and passes through dichroic beam splitter 6 toward detector 10.

According to the present invention, component 4 serves, in order to influence the coupled-in light 5, as the adjusting element of a control system 11. In the interest of clear depiction, control system 11 is identified by the reference character 11 only in FIGS. 1 and 3.

The purpose of control system 11 of FIG. 1 is to minimize fluctuations in the light output of the coupled-in light 5, and to achieve a constant light output in optical assemblage 3.

Figure 4:
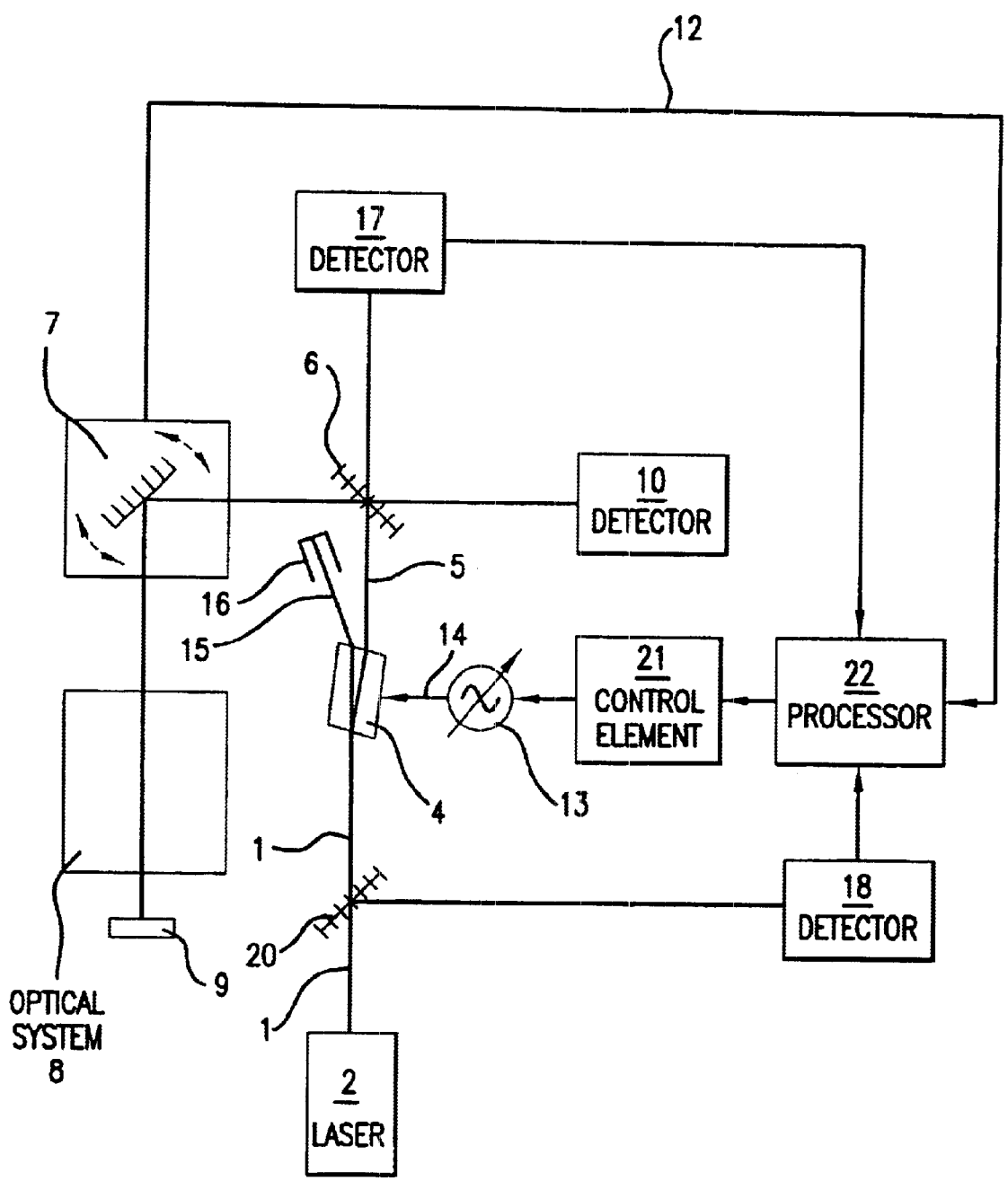
FIG. 4 is a schematic depiction of a fourth exemplary embodiment of the apparatus according to the present invention.

FIG. 4 shows that control system 11 is synchronized with the scanning operation of the confocal scanning microscope.

For that purpose, scanning device 7 is coupled via connection 12 to a component of control system 11. The position data of scanning device 7 are made available to control system 11 via connection 12.

Optically active component 4 of FIGS. 1 through 4 is embodied as an acoustooptical component, specifically as an AOTF. AOTF 4 is activated by a control unit 13. AOTF 4 can be impinged upon by an acoustic wave of a specific frequency, so that light of a wavelength region corresponding to one frequency of the acoustic wave can be coupled into acoustic assemblage 3. For that purpose, control unit 13 outputs an electromagnetic alternating voltage via adjusting line 14. This alternating voltage brings about a periodic deflection of the piezoelement (not shown) that is mounted directly on AOTF 4, with the result that an acoustic wave of a frequency corresponding to the electromagnetic alternating voltage passes through the crystal of the AOTF.

The power of coupled-in light 5 can be influenced by way of the amplitude of the frequency applied to AOTF 4. AOTF 4 is arranged in the beam path in such a way that light 1 is coupled into optical assemblage 3 only when control unit 13 is active; i.e. in order to couple in light 1 of a specific wavelength, control unit 13 must apply an electromagnetic alternating voltage to the AOTF in such a way that the acoustic wave running through AOTF 4 meets the Bragg condition for the light of the specific wavelength, and thus makes it available to the confocal scanning microscope as light 5 coupled into optical assemblage 3. If the AOTF is not being impinged upon at all, or with any acoustic wave of the appropriate frequency corresponding to the wavelengths of the light, then after passing through the AOTF, light 1 is absorbed by beam trap 16 as non-coupled-in light 15.

Figure 2:
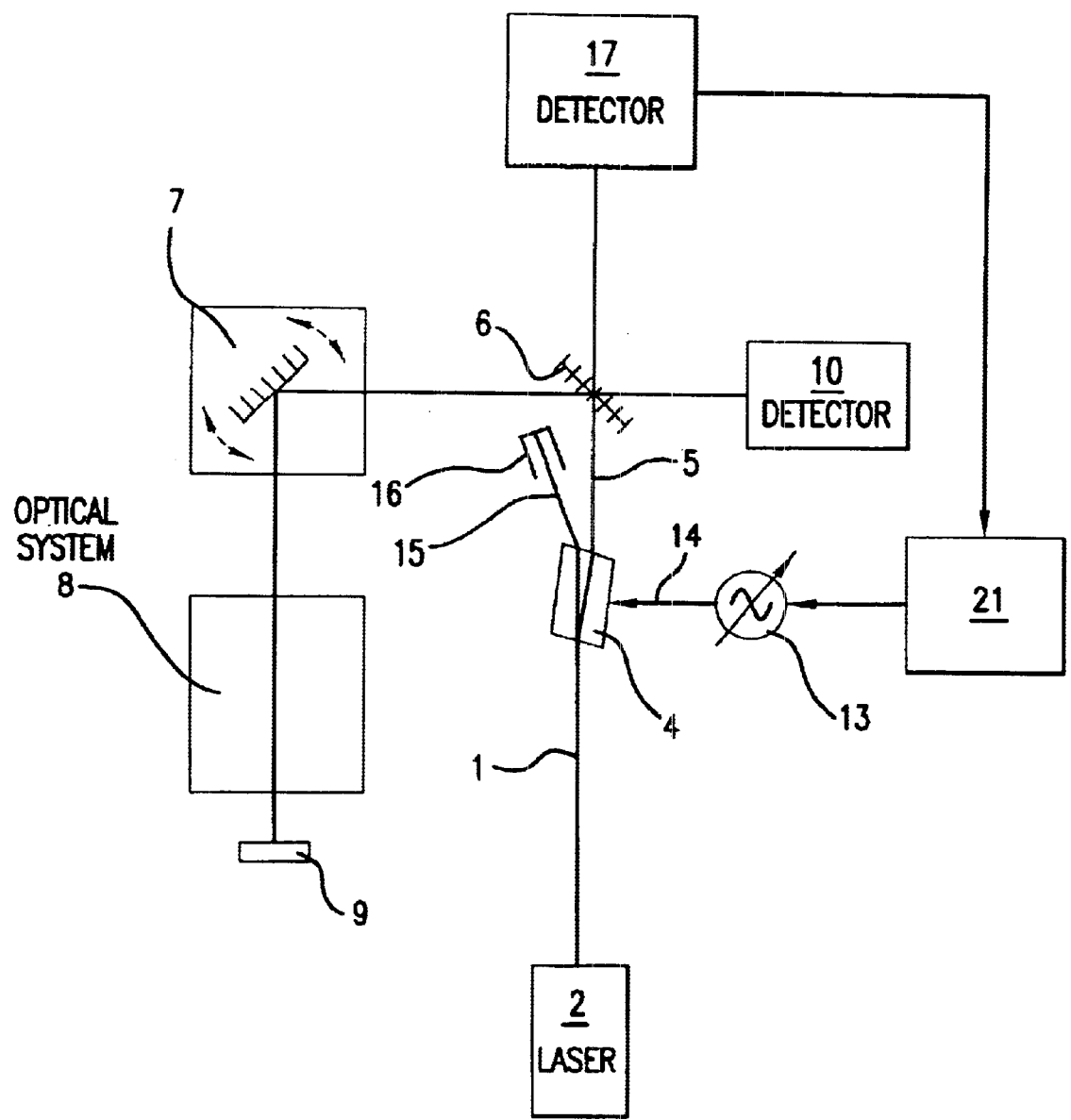
FIG. 2 is a schematic depiction of a second exemplary embodiment of the apparatus according to the present invention.
Figure 3:
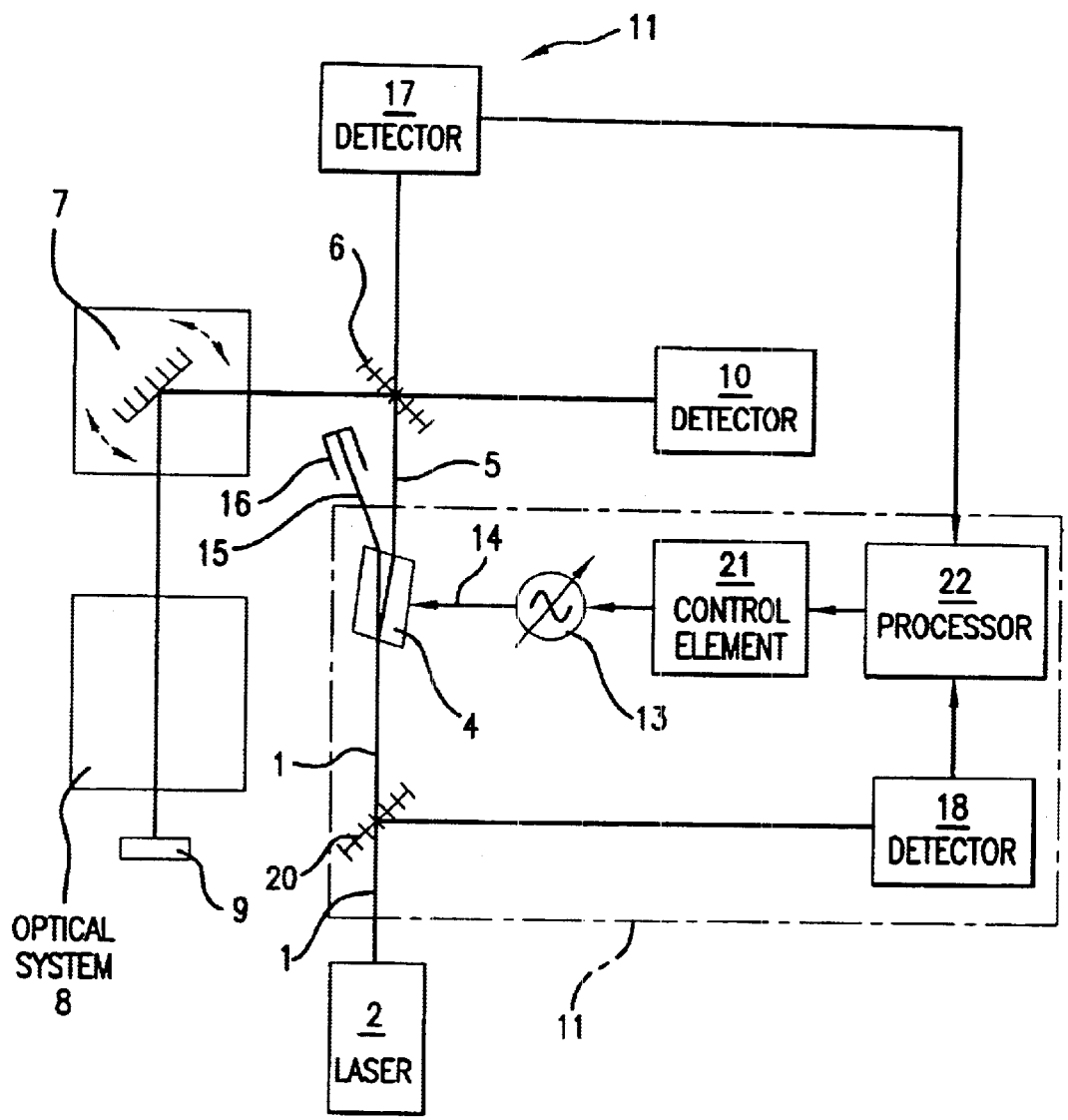
FIG. 3 is a schematic depiction of a third exemplary embodiment of the apparatus according to the present invention.

In the exemplary embodiments of FIGS. 2 through 4, the light output is detected by corresponding detectors 17, 18. In the exemplary embodiment of FIG. 1, the changes in the wavelengths of the light are detected by means of a semiconductor wavemeter 19. In the exemplary embodiments of FIGS. 1, 3, and 4, detector 18 or 19 that serves for measurement is arranged before the optical component, specifically behind an uncoated glass plate 20 that conveys to the respective detector a small portion of light 1 emitted from laser light source 2. In each of the exemplary embodiments of FIGS. 2 through 4, a detector 17 is additionally arranged after optically active component 4. Detector 17 is arranged behind a dichroic beam splitter 6. Detector 17 is a detector which ascertains the light output; detector 18 is a detector which can detect both the light output and the wavelength of the light.

It is evident from FIGS. 1 and 2 that the readings detected by detectors 17, 18, and 19 are conveyed to a controlling element 21. FIGS. 3 and 4 shows that the readings of a detector 18 arranged before optically active component 4 and the readings of a detector 17 arranged after optical component 4 are detected. Detection is accomplished simultaneously; the quotient of said readings is ascertained by processing unit 22 and then conveyed to controlling element 21.

Controlling element 21, by way of control unit 13, adjusts optically active component 4 as defined by the control system. In the event of a change in the wavelength of the light of laser light source 2, the frequency of the acoustic wave impinging upon optically active component 4 is adjusted by control unit 13. In the event of a change in the power of the light, the amplitude of the acoustic wave impinging upon optically active component 4 is adjusted by control unit 13.

The control strategy of the exemplary embodiment shown in FIG. 3 is designed for regulation to a specific fraction of the maximum transmission. The term "transmission" means the power of coupled-in light 5, and of the light passing through dichroic beam splitter 6, that is detected with power detector 17. In this exemplary embodiment, regulation to a specific transmission value corresponds at the same time to regulation to a corresponding power value of the coupled-in light; but all the control strategies referring to the power of the coupled-in light are also conceivable in terms of transmission.

In conclusion, be it noted very particularly that the exemplary embodiments discussed above serve merely to describe the teaching claimed, but do not limit it to the exemplary embodiments.

Parts List

1 Light of (2)
2 Laser light source
3 Optical assemblage
4 Optically active component, AOTF
5 Light coupled into (3)
6 Dichroic beam splitter
7 Scanning device
8 Microscope optical system
9 Specimen
10 Detector
11 Control system
12 Connection between (7) and (11)
13 Control unit of (4)
14 Adjusting line
15 Light not coupled into (3)
16 Beam trap
17 Power detector
18 Power and wavelength detector
19 Wavelength detector
20 Uncoated glass plate
21 Controlling element
22 Processing unit

What is claimed is:

1. A confocal scanning microscope comprising: a laser light source defining at least one wavelength, an apparatus for coupling light of the laser light source directly into the confocal scanning microscope, an optically active component being arranged in the apparatus for coupling light of the laser light source into the confocal scanning microscope, wherein the optically active component serves to select the wavelength and to set the power of the light to be coupled-in, a control system of the apparatus for influencing the component in order to minimize fluctuation in the light output of the light to be coupled-in, wherein at least one detector is arranged prior to the optically active component and connected to a controlling element which is part of the control system.

2. The confocal scanning microscope as defined in claim 1, wherein modifications and/or settings comprise selection of the power of the laser light source, selection of the ratio between coupled-in and non-coupled-in light, and/or a periodic amplitude modulation, which preferably is sinusoidal, of the light being coupled in.

3. The confocal scanning microscope as defined in claim 1, wherein the optically active component is an acoustooptical or electrooptical component.

4. The confocal scanning microscope as defined in claim 3, wherein the optically active component is an acoustooptical tunable filter (AOTF) or an acoustooptical beam splitter (AOBS), and is controllable by a control unit.

5. The confocal scanning microscope as defined in claim 1, wherein the at least one detector is a spectrometer, a multiband detector, or a semiconductor wavemeter to detect the changes in the wavelength of the light.

6. The confocal scanning microscope as defined in claim 1, wherein the control system is synchronized with an illumination operation or detection operation of the confocal scanning microscope.

7. The confocal scanning microscope as defined in claim 1 wherein the control system is synchronized with an illumination operation and detection operation of the confocal scanning microscope.

8. The confocal scanning microscope as defined in claim 1, wherein a detector used for measurement is arranged at least one of before and after the optically active component.

9. A confocal scanning microscope comprising: a laser light source defining at least one wavelength, an apparatus for coupling light of the laser light source directly into the confocal scanning microscope, an optically active component being arranged in the apparatus for coupling light of the laser light source into the confocal scanning microscope, wherein the optically active component serves to select the wavelength and to set the power of the light to be coupled-in, a control system for influencing the component in order to minimize fluctuations in the light output of the light to be coupled-in, and a first detector arranged before the optically active component and a second detector arranged after the optically active component, wherein the readings of the first and second detector are detected simultaneously, and the quotient of those readings is conveyed to a controlling element.

10. The confocal scanning microscope as defined in claim 9, wherein the optically active component is an acoustooptical or electrooptical component.

11. The confocal scanning microscope as defined in claim 10, wherein the optically active component is an acoustooptical tunable filter (AOTF) or an acoustooptical beam splitter (AOBS), and is controllable by a control unit.

12. The confocal scanning microscope as defined in claim 9, wherein the first or second detector is a spectrometer, a multiband detector, or a semiconductor wavemeter.

13. The confocal scanning microscope as defined in claim 9, wherein the control system is synchronized with at least one of an illumination operation and detection operation of the confocal scanning microscope.

14. The confocal scanning microscope as defined in claim 9, wherein the control system is synchronized with an illumination operation and/or detector operation of the confocal scanning microscope.

15. The confocal scanning microscope as defined in claim 14, wherein the control loop consists essentially of a phase-locked loop (PLL) circuit, a proportional-integral controller or a proportional-integral-differential controller.

* * * * *